US012737562B2

(12) United States Patent
Zhang et al.

(10) Patent No.: US 12,737,562 B2
(45) Date of Patent: Sep. 15, 2026

(54) SYSTEMS AND METHODS FOR TRANSLATION EVALUATION

(71) Applicant: ADOBE INC., San Jose, CA (US)

(72) Inventors: Pin Zhang, Kanagawa (JP); Shivali Goel, Milpitas, CA (US); Masatoshi Kawachi, Tokyo (JP); Yoshiki Takeoka, Chiba (JP); Reiko Obinata, Chiba (JP)

(73) Assignee: ADOBE INC., San Jose, CA (US)

( * ) Notice: Subject to any disclaimer, the term of this patent is extended or adjusted under 35 U.S.C. 154(b) by 323 days.

(21) Appl. No.: 17/663,045

(22) Filed: May 12, 2022

(65) Prior Publication Data

US 2023/0367975 A1 Nov. 16, 2023

(51) Int. Cl.

*G06F 40/51* (2020.01)
*G06F 40/284* (2020.01)
*G06F 40/47* (2020.01)
*G06F 40/58* (2020.01)
*G06N 3/02* (2006.01)

(52) U.S. Cl.

CPC ............ *G06F 40/51* (2020.01); *G06F 40/284* (2020.01); *G06F 40/47* (2020.01); *G06F 40/58* (2020.01); *G06N 3/02* (2013.01)

(58) Field of Classification Search

CPC ........ G06F 40/51; G06F 40/284; G06F 40/47; G06F 40/58; G06N 3/02; G06N 3/0442; G06N 3/0455; G06N 3/0464; G06N 3/048; G06N 3/09

See application file for complete search history.

(56) References Cited

U.S. PATENT DOCUMENTS 7,346,487 B2 * 3/2008 Li ........................... G06F 40/44 704/277
10,185,713 B1 * 1/2019 Denkowski ............. G06F 40/51
(Continued)

FOREIGN PATENT DOCUMENTS

CN 112347795 A * 2/2021 ............. G06F 18/24
CN 113609875 A * 11/2021 ............. G06N 3/044

OTHER PUBLICATIONS

1Yuan, et al., "Sentence Level Human Translation Quality Estimation with Attention-based Neural Networks", arXiv preprint arXiv:2003.06381v1 [cs.CL] Mar. 13, 2020, 9 pages.
(Continued)

*Primary Examiner* — Richemond Dorvil
*Assistant Examiner* — Zeeshan Mahmood Shaikh
(74) *Attorney, Agent, or Firm* — F. CHAU & ASSOCIATES, LLC

(57) ABSTRACT

Systems and methods for translation evaluation are provided. One or more aspects of the systems and methods includes receiving a source text, a context identifier for the source text, and a translation text, wherein the source text comprises text from a software application and the context identifier specifies a context of the source text within the software application; generating a source text representation and a translation text representation based on the source text, the context identifier, and the translation text using an encoder of a machine learning model; and generating translation quality information based on the source text representation and the translation text representation using a decoder of the machine learning model.

19 Claims, 9 Drawing Sheets

(56) References Cited

U.S. PATENT DOCUMENTS

| | | | | |
|---|---|---|---|---|
| 10,235,362 | B1 * | 3/2019 | Boynes | G06F 40/51 |
| 10,572,607 | B1 * | 2/2020 | Lesner | G06N 3/09 |
| 11,551,013 | B1 * | 1/2023 | Gupta | G06F 40/40 |
| 2016/0124944 | A1 * | 5/2016 | Andreoli | G06F 40/51 704/2 |
| 2017/0323203 | A1 * | 11/2017 | Matusov | G06F 40/30 |
| 2019/0266249 | A1 * | 8/2019 | Xu | G06F 40/103 |
| 2020/0233927 | A1 * | 7/2020 | Berger | G06F 40/216 |
| 2021/0182504 | A1 * | 6/2021 | Tu | G06N 3/092 |
| 2022/0067307 | A1 * | 3/2022 | Rei | G06N 3/084 |

OTHER PUBLICATIONS

2Papineni, et al., “BLEU: a Method for Automatic Evaluation of Machine Translation”, In Proceedings of the 40th Annual Meeting of the Association for Computational Linguistics (ACL), Jul. 2002, p. 311-318, 8 pages.

3Banerjee, et al., “METEOR: An Automatic Metric for MT Evaluation with Improved Correlation with Human Judgments”, In Proceedings of Workshop on Intrinsic and Extrinsic Evaluation Measures for MT and/or Summarization at the 43rd Annual Meeting of the Association of Computational Linguistics (ACL), Jun. 2005, 8 pages.

* cited by examiner

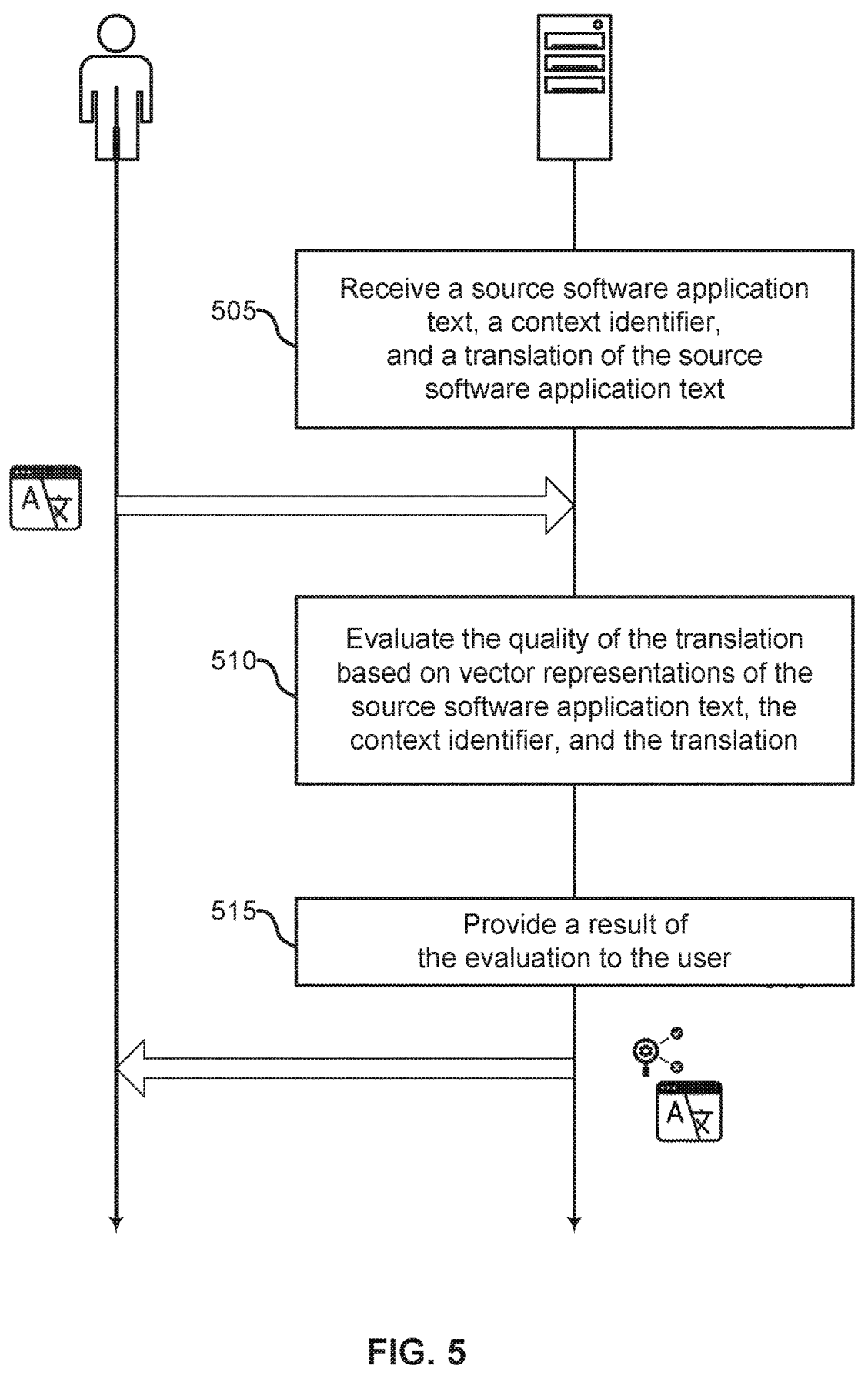

505 Receive a source software application text, a context identifier, and a translation of the source software application text 510 Evaluate the quality of the translation based on vector representations of the source software application text, the context identifier, and the translation 515 Provide a result of the evaluation to the user

FIG. 5

SYSTEMS AND METHODS FOR TRANSLATION EVALUATION

BACKGROUND

The following relates generally to natural language processing, and more specifically to translation evaluation. Natural language processing (NLP) refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers.

Machine learning-based NLP techniques may be applied in a translation evaluation context. Machine learning benefits translation evaluation processes by reducing human involvement in the evaluation process, thereby reducing associated time and costs. However, conventional machine learning-based translation evaluation techniques may require a reference translation of a source text to be available in order to evaluate a different translation of the source text, or may fail to account for the context of the source text within a software application. There is therefore need in the art for translation evaluation systems and methods that generates accurate translation quality information for a translation of a software application text.

SUMMARY

Embodiments of the present disclosure provide machine learning-based systems and methods for accurately evaluating a translation of software application text. By encoding representations of the translation and the software application text based on the translation, the software application text, and a context identifier that specifies a context of the software application text, and decoding the encoded representations to obtain translation quality information, embodiments of the present disclosure generate a numerical representation of the quality of the translation that is more accurate than conventional machine learning-based translation evaluations may provide, as the numerical representation accounts for the software application context of the translation.

A method, apparatus, non-transitory computer readable medium, and system for translation evaluation are described. One or more aspects of the method, apparatus, non-transitory computer readable medium, and system include receiving a source text, a context identifier for the source text, and a translation text, wherein the source text comprises text from a software application and the context identifier specifies a context of the source text within the software application; generating a source text representation and a translation text representation based on the source text, the context identifier, and the translation text using an encoder of a machine learning model; generating translation quality information based on the source text representation and the translation text representation using a decoder of the machine learning model, and displaying the translation quality information along with the source text and the translation text.

A method, apparatus, non-transitory computer readable medium, and system for translation evaluation are described. One or more aspects of the method, apparatus, non-transitory computer readable medium, and system include receiving training data including a source text, a context identifier for the source text, a translation text, and ground-truth translation quality information, wherein the source text comprises text from a software application and the context identifier specifies a context of the source text within the software application; generating a source text representation and a translation text representation based on the source text, the context identifier, and the translation text using an encoder of a machine learning model; generating predicted translation quality information based on the source text representation and the translation text representation using a decoder of the machine learning model; computing a loss function based on the predicted translation quality information and the ground truth translation quality information; and updating parameters of the machine learning model based on the loss function.

An apparatus and system for translation evaluation are described. One or more aspects of the apparatus and system include a context feature component configured to generate a context vector based on a context identifier that specifies a context of a source text within a software application; an encoder configured to generate a source text representation and a translation text representation based on the source text, a translation text, and the context vector; and a decoder configured to generate translation quality information based on the source text representation and the translation text representation.

BRIEF DESCRIPTION OF THE DRAWINGS

FIG. 5 shows an example of translation evaluation according to aspects of the present disclosure.

DETAILED DESCRIPTION

Figure 1:
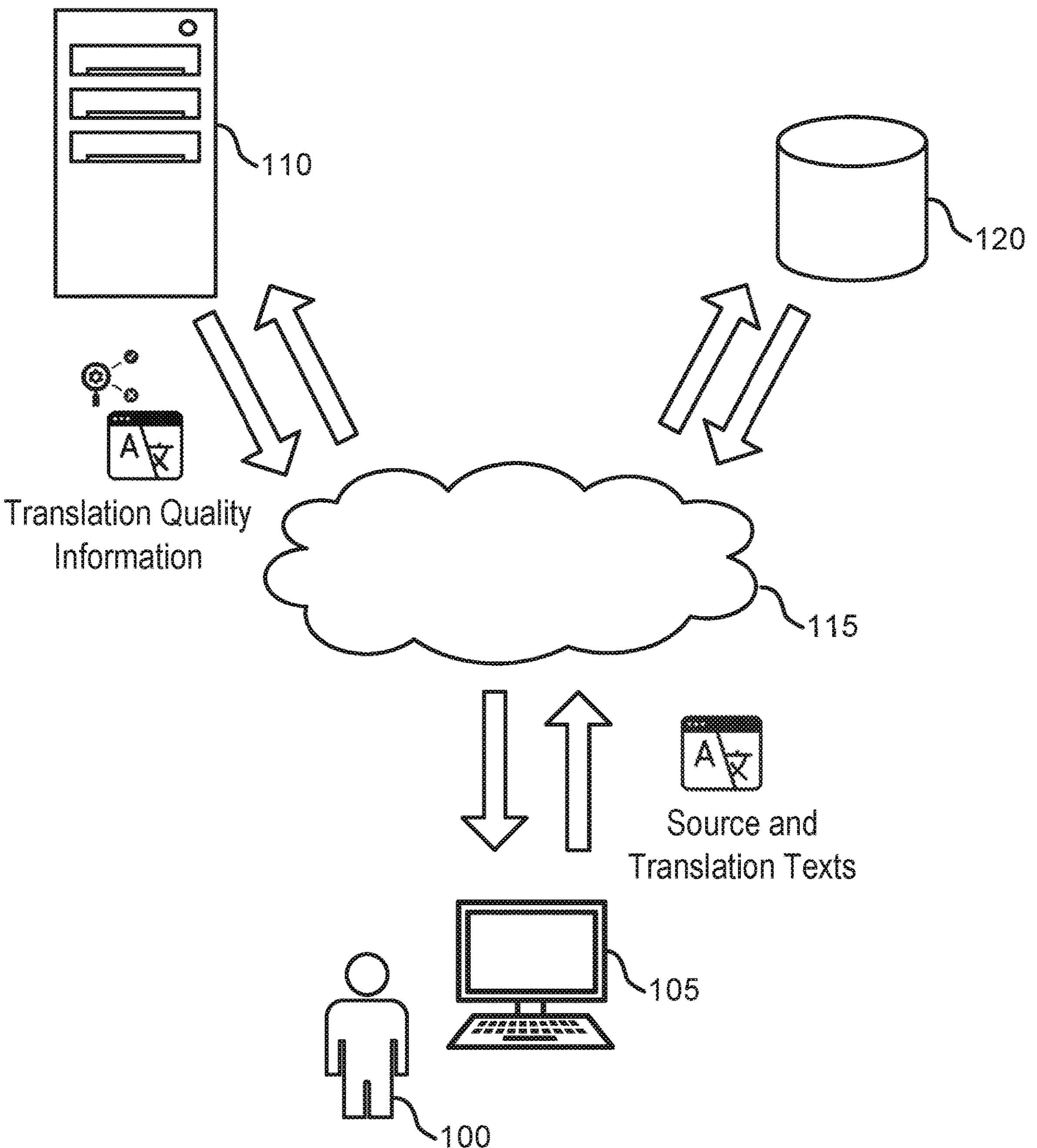
FIG. 1 shows an example of a translation evaluation system according to aspects of the present disclosure.

Natural language processing (NLP) refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers.

Machine learning-based NLP techniques may be applied in a translation evaluation context. Machine learning benefits translation evaluation processes by reducing human involvement in the evaluation process, thereby reducing associated time and costs. However, conventional machine learning-based translation evaluation techniques may require a reference translation of a source text to be available in order to evaluate a different translation of the source text, or may fail to account for the context of the source text within a software application. There is therefore need in the art for translation evaluation systems and methods that generates accurate translation quality information for a translation of a software application text.

The present disclosure provides systems and methods for translation evaluation that generate accurate translation quality information corresponding to a translation text and a source text, where the source text includes text from a software application. In at least one embodiment, a system includes a translation evaluation apparatus that receives a source text, a context identifier, and a translation text. The source text includes text from a software application and the context identifier specifies a context of the source text within the software application. In some embodiments, the translation evaluation apparatus includes an encoder that generates a source text representation and a translation text representation based on the source text, the translation text, and the context identifier. In some embodiments, the translation evaluation apparatus includes a decoder that generates translation quality information based on the source text representation and the translation text representation.

Therefore, according to some aspects, the system takes the software application context of the source text into account by generating the translation quality information based on the context identifier, thereby increasing the accuracy of the translation quality information. According to some aspects, the system does not generate the translation quality information based on a reference translation of the source text, thereby reducing processing time and labor associated with producing the reference translation.

Some conventional machine learning-based translation evaluation techniques use a cross-lingual textual entailment (CLTE) approach to evaluating translation quality. However, conventional machine learning-based translation evaluation techniques may lack handcrafted CLTE features that are useful in evaluating a source/translation pair taken from a software application domain, or may fail to grasp semantic contextual information from a source/translation pair as well as similarities/differences among synonyms included in the source/translation pair. According to some aspects of the present disclosure, the system includes a CLTE component that uses handcrafted features to generate a CLTE feature vector representing a plurality of structural features of the source text and the translation text, and generates the translation quality information based on the CLTE feature vector. Accordingly, the system further accounts for the software application context in the translation quality information.

Furthermore, some conventional machine learning-based translation evaluation techniques use contextual information when creating embeddings of source/text translation pairs, but these techniques may not account for context information that is specific to a software localization context. For example, text displayed in software applications may be shorter than texts included in documents, and translations of texts displayed in software may be strongly associated with visual contexts (e.g., whether a text is included in a user interface button's label versus a popup message displayed in the user interface). The quality of a shorter text is more difficult to evaluate, as there may be less contextual information associated with the shorter text, and visual context dependency may mislead the training of a machine learning model if the visual context is not captured in feature representations. Therefore, by generating translation quality information based on a context identifier that corresponds to text from a software application, embodiments of the present disclosure can achieve a higher accuracy in software application translation evaluation than conventional machine learning translation evaluation techniques.

At least one embodiment of the present disclosure is used in a translation quality assurance context. In an example, a user uses a translation evaluation apparatus as described with reference to the accompanying drawings to generate and display a numerical evaluation of the quality of a translation text that is a translation of a source text, where the numerical evaluation accounts for a software application context of the source text. An example application of the present disclosure in the translation quality assurance context is described with reference to FIGS. 1 and 5. Details regarding the architecture of a translation evaluation system are provided with reference to FIGS. 1-4. Examples of a process for translation evaluation are described with reference to FIGS. 5-8. Examples of a process for training a machine learning model are provided with reference to FIG. 9.

Translation Evaluation System

An apparatus and system for translation evaluation is described with reference to FIGS. 1-4. One or more aspects of the apparatus and system include a context feature component configured to generate a context vector based on a context identifier that specifies a context of a source text within a software application; an encoder configured to generate a source text representation and a translation text representation based on the source text, a translation text, and the context vector; and a decoder configured to generate translation quality information based on the source text representation and the translation text representation.

Some examples of the apparatus and system further include a cross-lingual textual entailment (CLTE) component configured to generate a CLTE feature vector representing a plurality of structural features of the source text and the translation text, wherein the translation quality information is based on the CLTE feature vector. In some aspects, the encoder includes a recurrent neural network and a cross-attention module. In some aspects, the decoder includes a regressor network and a classifier network.

FIG. 1 shows an example of a translation evaluation system according to aspects of the present disclosure. The example shown includes user 100, user device 105, translation evaluation apparatus 110, cloud 115, and database 120.

Referring to FIG. 1, user 100 provides translation evaluation apparatus 110 with a source text, a translation text, and a context identifier, where the context identifier is metadata that specifies types and locations of the source text in a software application, as well as the purposes of the source text. Examples of metadata included in the context identifier includes "OK button label", "prompt message", "main window title", etc. Translation evaluation apparatus 110 uses a machine learning model to encode a source text representation and a translation test representation based on the source text, the translation text, and the context identifier, and decodes the source text representation and the translation text representation to obtain translation quality information that provides a numerical assessment of the quality of the translation text and accounts for the software application context of the source text and the translation text. Translation evaluation apparatus 110 then provides user 100 with the translation quality information.

According to some aspects, user device 105 is a personal computer, laptop computer, mainframe computer, palmtop computer, personal assistant, mobile device, or any other suitable processing apparatus. In some examples, user device 105 includes software that enables user 100 to provide the source text, the context identifier, and the translation text to translation evaluation apparatus 110, and to receive and display the translation quality information. In some cases, user device 105 displays a graphical user interface provided by translation evaluation apparatus 110 for user 100 to communicate information with translation evaluation apparatus 110.

According to some aspects, a user interface enables user 100 to interact with user device 105. In some embodiments, the user interface may include an audio device, such as an external speaker system, an external display device such as a display screen, or an input device (e.g., a remote control device interfaced with the user interface directly or through an IO controller module). In some cases, the user interface may be a graphical user interface (GUI).

According to some aspects, translation evaluation apparatus 110 includes a computer implemented network. In some embodiments, the computer implemented network includes a machine learning model including one or more neural networks. In some embodiments, translation evaluation apparatus 110 also includes one or more processors, a memory subsystem, a communication interface, an I/O interface, one or more user interface components, and a bus. Additionally, in some embodiments, translation evaluation apparatus 110 communicates with user device 105 and database 120 via cloud 115.

In some cases, translation evaluation apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general purpose computing device, a personal computer, a laptop computer, a mainframe computer, a supercomputer, or any other suitable processing apparatus.

Figure 2:
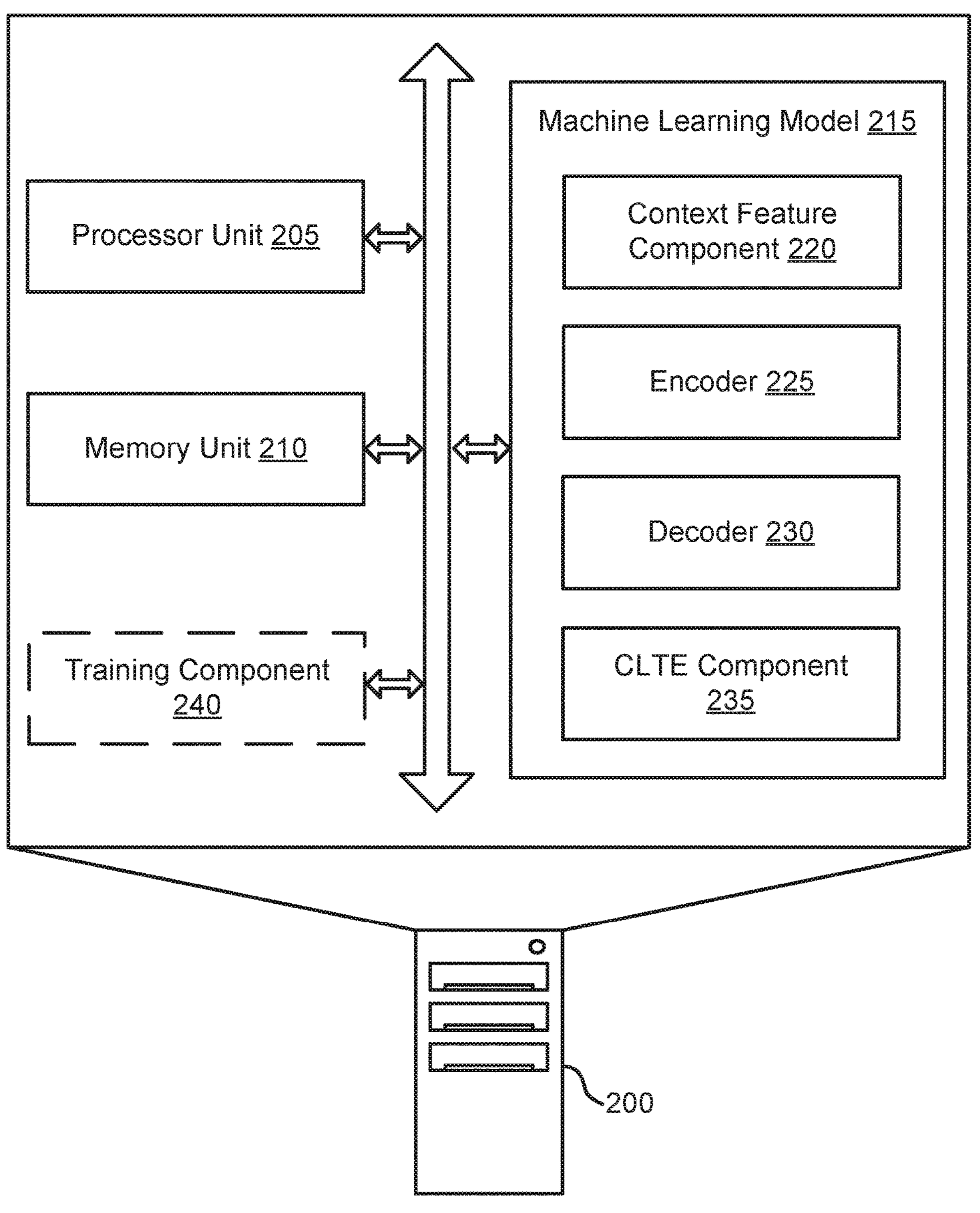
FIG. 2 shows an example of a translation evaluation apparatus according to aspects of the present disclosure.
Figure 3:
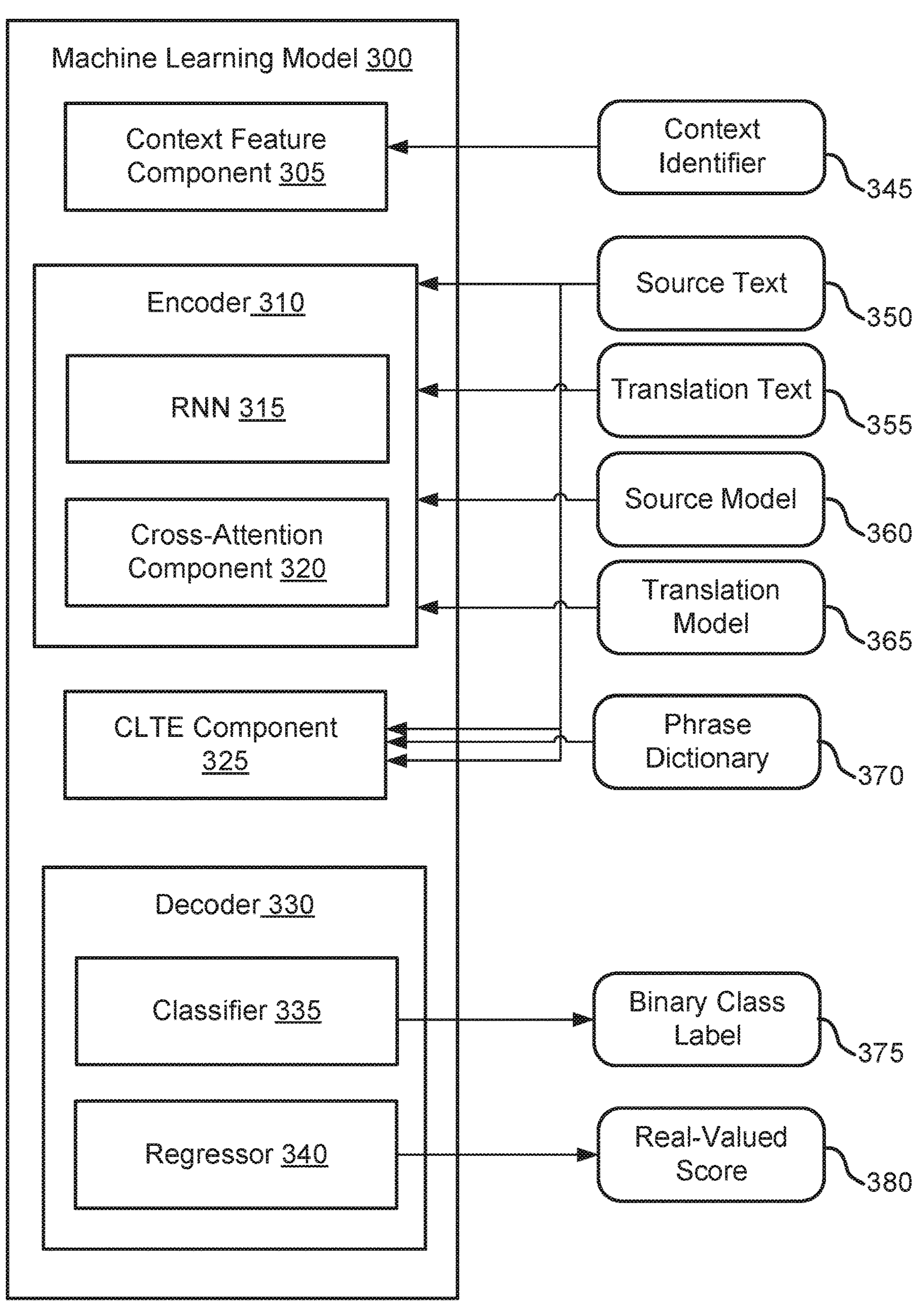
FIG. 3 shows an example of a machine learning model according to aspects of the present disclosure.
Figure 4:
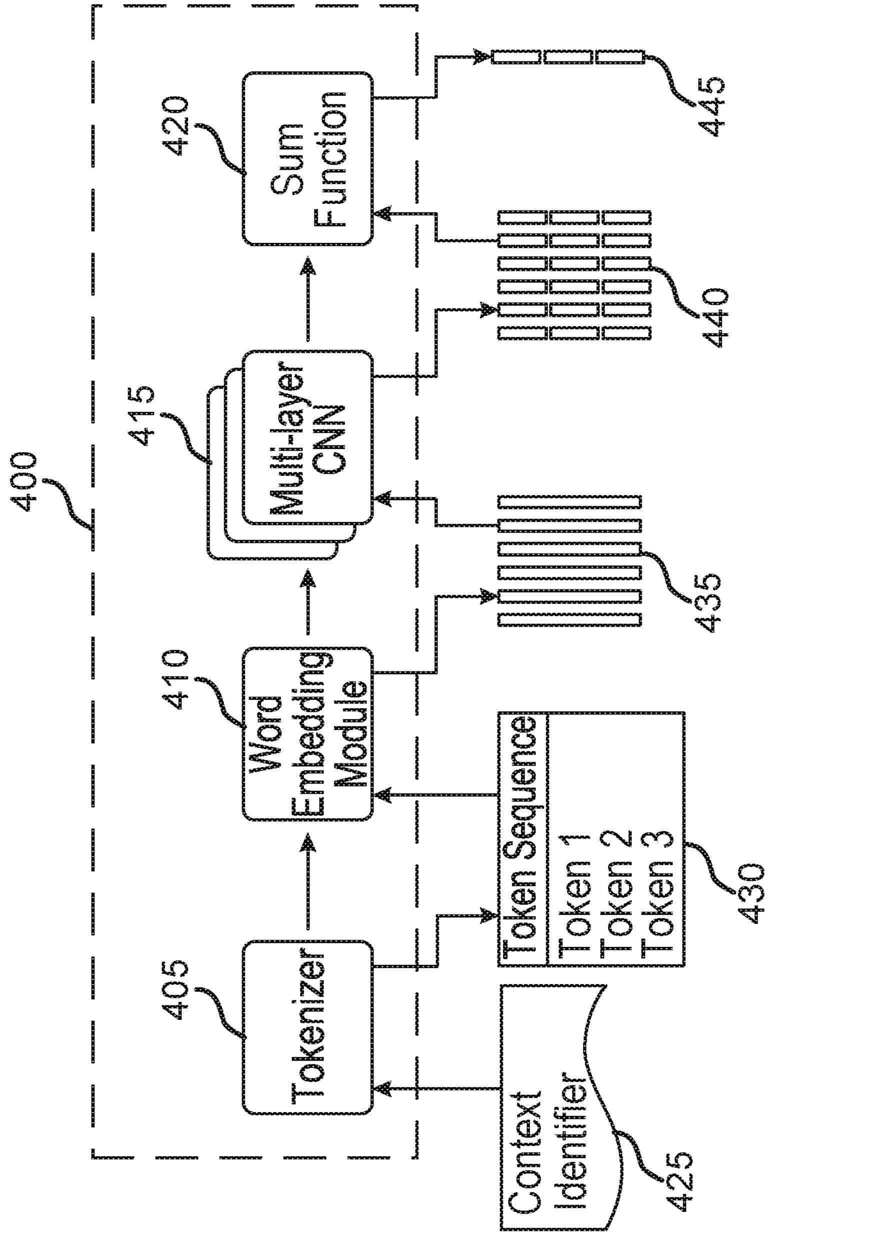
FIG. 4 shows an example of a context feature component according to aspects of the present disclosure.

Further detail regarding the architecture of translation evaluation apparatus 110 is provided with reference to FIGS. 2-4. Further detail regarding a process for translation evaluation is provided with reference to FIGS. 5-8. Further detail regarding a process for training the machine learning model is provided with reference to FIG. 9. Translation evaluation apparatus 110 is an example of, or includes aspects of, the corresponding element described with reference to FIG. 2.

A cloud such as cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some aspects, cloud 115 provides communications between user device 105, translation evaluation apparatus 110, and database 120.

A database such as database 120 is an organized collection of data. In an example, database 120 stores data in a specified format known as a schema. According to some aspects, database 120 is structured as a single database, a distributed database, multiple distributed databases, or an emergency backup database. In some cases, a database controller manages data storage and processing in database 120. In some cases, user 100 interacts with the database controller. In other cases, the database controller operates automatically without user interaction.

According to some aspects, database 120 stores information such as a source text, a translation text, a context identifier, and/or a training set including a source text, a context identifier for the source text, a translation text, and/or ground-truth translation quality information. According to some aspects, database 120 stores the various outputs (such as vector representations, attention weights, similarity scores, and translation quality information) generated by components of translation evaluation apparatus 110. In some embodiments, database 120 is external to translation evaluation apparatus 110 and communicates with translation evaluation apparatus 110 via cloud 115. In some embodiments, database 120 is included in translation evaluation apparatus 110.

FIG. 2 shows an example of a translation evaluation apparatus according to aspects of the present disclosure. Translation evaluation apparatus 200 is an example of, or includes aspects of, the corresponding element described with reference to FIG. 1. According to some aspects, translation evaluation apparatus 200 receives a source text, a context identifier for the source text, and a translation text, where the source text includes text from a software application and the context identifier specifies a context of the source text within the software application. In one aspect, translation evaluation apparatus 200 includes processor unit 205, memory unit 210, machine learning model 215, and training component 240.

Processor unit 205 includes one or more processors. A processor is an intelligent hardware device such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

Memory unit 210 includes one or more memory devices. Examples of a memory device include random access memory (RAM), read-only memory (ROM), or a hard disk. Examples of memory devices include solid state memory and a hard disk drive. In some examples, memory unit 210 is used to store computer-readable, computer-executable software including instructions that, when executed, cause a processor of processor unit 205 to perform various functions described herein. In some cases, memory unit 210 contains, among other things, a basic input/output system (BIOS) which controls basic hardware or software operation such as the interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, machine learning model 215 is implemented as a hardware circuit, as firmware, or as software. In one aspect, machine learning model 215 includes one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In one aspect, machine learning model 215 includes context feature component 220, encoder 225, decoder 230, and cross-lingual textual entailment (CLTE) component 235. In one aspect, each of context feature component 220, encoder 225, decoder 230, and CLTE component 235 includes one or more ANNs.

According to some aspects, context feature component 220 generates a set of token embeddings corresponding to words of the context identifier. In some examples, context feature component 220 generates a set of contextual embeddings for the context identifier based on the set of token embeddings. In some examples, context feature component 220 combines the set of contextual embeddings to obtain a context vector, where the source text representation and the translation text representation are based on the context vector.

According to some aspects, context feature component 220 is configured to generate a context vector based on a context identifier that specifies a context of a source text within a software application. In some aspects, context feature component 220 is implemented as a hardware circuit, as firmware, or as software. Context feature component 220 is an example of, or includes aspects of, the corresponding element described with reference to FIGS. 3 and 4.

According to some aspects, encoder 225 generates a source text representation and a translation text representation based on the source text, the context identifier, and the translation text. In some examples, encoder 225 generates a source text embedding and a translation text embedding based on the source text and the translation text, where the source text representation and the translation text representation are based on the source text embedding and the translation text embedding. In some examples, encoder 225 identifies a source language of the source text and a translation language of the translation text. In some examples, encoder 225 selects a source language model based on the source language and a translation language model based on the translation language, where the source text embedding and the translation text embedding are based on the source language model and the translation language model, respectively.

In some examples, encoder 225 removes markup tags from the source text and the translation text to obtain a pre-processed source text and a pre-processed translation text, where the source text embedding is based on the pre-processed source text and the translation text embedding is based on the pre-processed translation text. In some examples, encoder 225 replaces localization terms in the source text and the translation text with localization placeholders to obtain a pre-processed source text and a pre-processed translation text, where the source text embedding is based on the pre-processed source text and the translation text embedding is based on the pre-processed translation text.

In some examples, encoder 225 generates a source text attention mask and a translation text attention mask based on the source text and the translation text, where the source text representation and the translation text representation are based on the source text attention mask and the translation text attention mask.

In some aspects, encoder 225 includes a recurrent neural network. A recurrent neural network (RNN) is a class of ANN in which connections between nodes form a directed graph along an ordered (i.e., a temporal) sequence. This enables the RNN to model temporally dynamic behavior such as predicting what element should come next in a sequence. Thus, an RNN is suitable for tasks that involve ordered sequences such as text recognition (where words are ordered in a sentence). Examples of RNNs include finite impulse recurrent networks (characterized by nodes forming a directed acyclic graph) and infinite impulse recurrent networks (characterized by nodes forming a directed cyclic graph). In one aspect, the RNN is implemented as a hardware circuit, as firmware, or as software. The RNN is an example of, or includes aspects of, the corresponding element described with reference to FIG. 3.

In some aspects, encoder 225 includes a cross-attention module. In the machine learning field, a cross-attention module implements a technique of placing differing levels of importance on different elements of an input. In some aspects, calculating an attention score involves three basic steps. First, the cross-attention module computes a similarity between query and key vectors obtained from an input to generate attention weights. Similarity functions used for this process can include dot product, splice, detector, and the like. Next, the cross-attention module uses a softmax function to normalize the attention weights. Finally, the cross-attention module weighs the attention weights together with their corresponding values to obtain the attention scores.

In one aspect, the cross-attention module is implemented as a hardware circuit, as firmware, or as software. The cross-attention module is an example of, or includes aspects of, the corresponding element described with reference to FIG. 3.

In one aspect, encoder 225 is implemented as a hardware circuit, as firmware, or as software. Encoder 225 is an example of, or includes aspects of, the corresponding element described with reference to FIG. 3.

According to some aspects, decoder 230 generates translation quality information based on the source text representation and the translation text representation. According to some aspects, decoder 230 generates predicted translation quality information based on the source text representation and the translation text representation.

In some examples, decoder 230 generates a binary class label for the translation text based on the source text representation and the translation text representation, where the translation quality information includes the binary class label. In some examples, decoder 230 generates a real-valued score for the translation text based on the source text representation and the translation text representation, where the translation quality information includes the real-valued score.

According to some aspects, decoder 230 is configured to generate translation quality information based on the source text representation and the translation text representation. In some aspects, the decoder 230 includes a regressor network and a classifier network. In some aspects, decoder 230 is implemented as a hardware circuit, as firmware, or as software. Decoder 230 is an example of, or includes aspects of, the corresponding element described with reference to FIG. 3.

According to some aspects, CLTE component 235 generates a cross-lingual textual entailment (CLTE) feature vector representing a set of structural features of the source text and the translation text, where the translation quality information is based on the CLTE feature vector. In some aspects, the CLTE feature vector includes syntactic features and dependency role-based features. In some examples, CLTE component 235 identifies a phrase dictionary between a source language of the source text and a translation language of the translation text. In some examples, CLTE component 235 computes dictionary features based on the phrase dictionary, where the CLTE feature vector includes the dictionary features.

According to some aspects, CLTE component 235 is configured to generate a CLTE feature vector representing a set of structural features of the source text and the translation text, where the translation quality information is based on the CLTE feature vector. In some aspects, CLTE component 235 is implemented as a hardware circuit, as firmware, or as software. CLTE component 235 is an example of, or includes aspects of, the corresponding element described with reference to FIG. 3.

According to some aspects, training component 240 receives training data including a source text, a context identifier for the source text, a translation text, and ground-truth translation quality information, where the source text includes text from a software application and the context identifier specifies a context of the source text within the software application. In some examples, training component 240 computes a loss based on the predicted translation quality information and the ground truth translation quality information. In some examples, training component 240 updates parameters of the machine learning model 215 based on the loss. In some aspects, the context identifier indicates an association between the source text and a component of a user interface of the software application.

In some aspects, training component 240 is implemented as a hardware circuit, as firmware, or as software. In one aspect, training component 240 is omitted from translation evaluation apparatus 200 and is included in an external device that communicates with translation evaluation apparatus 200 to train translation evaluation apparatus 200.

FIG. 3 shows an example of a machine learning model according to aspects of the present disclosure. The example shown includes machine learning model 300, context identifier 345, source text 350, translation text 355, source language model 360, translation language model 365, phrase dictionary 370, binary class label 375, and real-valued score 380. In one aspect, machine learning model includes context feature component 305, encoder 310, CLTE component 325, and decoder 330. Machine learning model is an example of, or includes aspects of, the corresponding element described with reference to FIG. 2.

According to some aspects, context feature component 305 converts context identifier 345 into feature representations so that software application contexts of source text 350 and/or translation text 355 can be used by decoder 330 when generating translation quality information. Context feature component 305 receives context identifier 345 as input and generates a vector representation of the software application context (e.g., the context vector). Context feature component is an example of, or includes aspects of, the corresponding element described with reference to FIGS. 2 and 4.

According to some aspects, encoder 310 applies software-localization preprocessing to source text 350 and translation text 355 and then converts source text 350 and translation text 355 into distributional vector representations (e.g., a source text representation and a translation text representation). In some embodiments, the distributional vector representations generated by encoder 310 include semantic information of each word in source text 350 and translation text 355, as well as the contextual information of the words. According to some aspects, encoder 310 generates the distributional vector representations based on source language model 360 and/or translation language model 365. According to some aspects, encoder 310 includes a pre-trained language model, such as BERT, XLM-R, ELMo, etc. Encoder 310 is an example of, or includes aspects of, the corresponding element described with reference to FIG. 2.

According to some aspects, encoder 310 includes recurrent neural network 315. In some embodiments, recurrent neural network 315 generates a hidden source text representation and a hidden translation text representation based on the source text embedding, the translation text embedding, and the context identifier. In some embodiments, recurrent neural network 315 receives the vector representations output by encoder 310 and a context vector output by context feature component 305 as input and generates combined hidden states of each layer and direction for each word/sub-word in source text 350 and translation text 355.

According to some aspects, recurrent neural network 315 is a bidirectional RNN. According to some aspects, recurrent neural network 315 is implemented as a gated recurrent unit (GRU). In some embodiments, recurrent neural network 315 includes two RNN layers. In some embodiments, the size of each of the source text representation and the translation text representation is 200. Recurrent neural network 315 is an example of, or includes aspects of, the corresponding element described with reference to FIG. 2.

According to some aspects, encoder 310 includes cross-attention component 320. In some embodiments, cross-attention component 320 generates a source text representation and a translation text representation based on the hidden source text representation and the hidden translation text representation. In some embodiments, cross-attention component 320 receives the hidden representations generated by recurrent neural network 315 and attention masks generated by encoder 310 as inputs, calculates attention scores for each word/sub-word in source text 350 and translation text 355, and then uses a pooling function to generate sentence-wise representations for both source text 350 and translation text 355 (e.g., the source text representation and the translation text representation) based on the attention scores and hidden representations of each word/sub-word. Cross-attention component 320 is an example of, or includes aspects of, the corresponding element described with reference to FIG. 2.

According to some aspects, CLTE component 325 receives source text 350 and translation text 355 as input and calculates a cross-lingual textual entailment (CLTE) vector. In some embodiments, CLTE component 325 also receives phrase dictionary 370 as input, and the CLTE vector is based on phrase dictionary 370. In some embodiments, CLTE component 325 also receives one or more word embedding dictionaries as input, and the CLTE vector is based on the one or more word embedding dictionaries. CLTE component 325 is an example of, or includes aspects of, the corresponding element described with reference to FIG. 2.

Decoder 330 is an example of, or includes aspects of, the corresponding element described with reference to FIG. 2. According to some aspects, decoder 330 includes classifier network 335. In some embodiments, classifier network 335 receives the outputs of cross-attention component 320 and CLTE component 325 as inputs, aggregates both of the inputs into combined vectors, and generates the translation quality information by predicting binary class label 375 for source text 350 and translation text 355. In some embodiments, classifier network 335 is implemented as a hardware circuit, as firmware, or as software. In some embodiments, classifier network 335 includes one classifier layer. In some embodiments, a size of a hidden layer included in classifier network 335 is 300. In some embodiments, classifier network 335 includes a LeakyReLU activation function. In some embodiments, a dropout rate of classifier network 335 is 0.5.

According to some aspects, decoder 330 includes regressor network 340. In some embodiments, regressor network 340 receives the outputs of cross-attention component 320 and CLTE component 325 as inputs, aggregates both of the inputs into combined vectors, and generates the translation quality information by predicting real-valued score 380 for source text 350 and translation text 355. In some aspects, regressor network 340 is implemented as a hardware circuit, as firmware, or as software. In some embodiments, regressor network 340 includes five regressor layers. In some embodiments, a size of a hidden layer included in regressor network 340 is 300. In some embodiments, regressor network 340 includes a LeakyReLU activation function. In some embodiments, a dropout rate of regressor network 340 is 0.5.

FIG. 4 shows an example of a context feature component according to aspects of the present disclosure. The example shown includes context feature component 400, context identifier 425, token sequence 430, token embeddings 435, contextual embeddings 440, and context vector 445. Context feature component 400 is an example of, or includes aspects of, the corresponding element described with reference to FIGS. 2 and 3. In one aspect, context feature component 400 includes tokenizer 405, word embedding module 410, multi-layer CNN 415, and sum function 420.

Referring to FIG. 4, according to some aspects, context feature component 400 tokenizes context identifier 425. In an example, context feature component 400 separates context identifier 425 into words by using a predefined set of delimiters on context identifier 425 and breaking camel-cased strings (e.g., strings including no spaces or punctuation, where each word is differentiated from a preceding word by an initial capital letter) in context identifier 425 into separate words. According to some aspects, after context identifier 425 is tokenized, context feature component 400 generates a context vector using a convolutional neural network (CNN) contextual embedding approach.

In some embodiments, tokenizer 405 receives context identifier 425 and outputs token sequence 430, word embedding module 410 receives token sequence 430 and outputs token embeddings 435, multi-layer CNN 415 receives token embeddings 435 and outputs contextual embeddings 440, and sum function 420 receives contextual embeddings 440 and outputs context vector 445. In some embodiments, the size of token embeddings 435 is 150. The operations of context feature component 400 are further described with reference to FIG. 8.

According to some aspects, multi-layer CNN 415 is a one-dimensional convolutional neural network (CNN). A CNN is a class of neural network that is commonly used in computer vision or image classification systems. In some cases, a CNN is characterized by the use of convolutional (or cross-correlational) hidden layers. These layers apply a convolution operation to the input before signaling the result to the next layer. Each convolutional node processes data for a limited field of input (i.e., the receptive field). During a forward pass of the CNN, filters at each layer are convolved across the input volume, computing the dot product between the filter and the input. In some cases, during a training process, the filters are modified so that they activate when they detect a particular feature within the input.

According to some aspects, each of tokenizer 405, word embedding module 410, multi-layer CNN 415, and sum function 420 are implemented as one or more hardware circuits, as firmware, or as software. In some embodiments, multi-layer CNN includes four layers. In some embodiments, the size of an analysis window of a first CNN layer of multi-layer CNN 415 is one, the size of an analysis window of a second CNN layer of multi-layer CNN 415 is two, the size of an analysis window of a third CNN layer of multi-layer CNN 415 is three, and the size of an analysis window of a fourth CNN layer of multi-layer CNN 415 is four. In some embodiments, the dropout rate of context feature component 400 is 0.5.

Translation Evaluation

A method for translation evaluation is described with reference to FIGS. 5-8. One or more aspects of the method include receiving a source text, a context identifier for the source text, and a translation text, wherein the source text comprises text from a software application and the context identifier specifies a context of the source text within the software application; generating a source text representation and a translation text representation based on the source text, the context identifier, and the translation text using an encoder of a machine learning model; and generating translation quality information based on the source text representation and the translation text representation using a decoder of the machine learning model.

Some examples of the method further include generating a source text embedding and a translation text embedding based on the source text and the translation text, wherein the source text representation and the translation text representation are based on the source text embedding and the translation text embedding.

Some examples of the method further include identifying a source language of the source text and a translation language of the translation text. Some examples further include selecting a source language model based on the source language and a translation language model based on the translation language, wherein the source text embedding and the translation text embedding are based on the source language model and the translation language model, respectively.

Some examples of the method further include removing markup tags from the source text and the translation text to obtain a pre-processed source text and a pre-processed translation text, wherein the source text embedding is based on the pre-processed source text and the translation text embedding is based on the pre-processed translation text. Some examples of the method further include replacing localization terms in the source text and the translation text with localization placeholders to obtain a pre-processed source text and a pre-processed translation text, wherein the source text embedding is based on the pre-processed source text and the translation text embedding is based on the pre-processed translation text.

Some examples of the method further include generating a source text attention mask and a translation text attention mask based on the source text and the translation text, wherein the source text representation and the translation text representation are based on the source text attention mask and the translation text attention mask.

Some examples of the method further include generating a hidden source text representation and a hidden translation text representation based on the source text embedding, the translation text embedding, and the context identifier using a recurrent neural network of the encoder. Some examples of the method further include generating the source text representation and the translation text representation based on the hidden source text representation and the hidden translation text representation using a cross-attention component of the encoder.

Some examples of the method further include generating a plurality of token embeddings corresponding to words of the context identifier. Some examples further include generating a plurality of contextual embeddings for the context identifier based on the plurality of token embeddings. Some examples further include combining the plurality of contextual embeddings to obtain a context vector, wherein the source text representation and the translation text representation are based on the context vector.

Some examples of the method further include generating a cross-lingual textual entailment (CLTE) feature vector representing a plurality of structural features of the source text and the translation text, wherein the translation quality information is based on the CLTE feature vector. In some aspects, the CLTE feature vector includes syntactic features and dependency role-based features. Some examples of the method further include identifying a phrase dictionary between a source language of the source text and a translation language of the translation text. Some examples further include computing dictionary features based on the phrase dictionary, wherein the CLTE feature vector includes the dictionary features.

Some examples of the method further include generating a binary class label for the translation text based on the source text representation and the translation text representation, wherein the translation quality information includes the binary class label. Some examples of the method further include generating a real-valued score for the translation text based on the source text representation and the translation text representation, wherein the translation quality information includes the real-valued score.

FIG. 5 shows an example of translation evaluation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, an embodiment of the present disclosure is used in a translation quality assurance context. For example, a user provides the system with a source text, a translation text, and a context identifier, where the context identifier is metadata that specifies types and locations of the source text in a software application, as well as the purposes of the source text. Examples of metadata included in the context identifier includes “OK button label”, “prompt message”, “main window title”, etc. The system uses machine learning to encode a source text representation and a translation test representation, and decodes the source test representation and the translation text representation to obtain translation quality information that represents a numerical assessment of the quality of the translation text. The system then provides the user with the translation quality information.

At operation 505, the system receives a source software application text, a context identifier, and a translation of the source software application text. In some cases, the operations of this step refer to, or may be performed by, a translation evaluation apparatus as described with reference to FIGS. 1 and 2. For example, the user may be a translation program manager who has a source text and a translation of the source text, where the context identifier is attached to the source text as metadata. In some embodiments, the user uploads the source text and the translation to the translation evaluation apparatus via an interaction with a graphical user interface displayed on the user device by the translation evaluation apparatus.

At operation 510, the system evaluates the quality of the translation based on vector representations of the source software application text, the context identifier, and the translation. In some cases, the operations of this step refer to, or may be performed by, a translation evaluation apparatus as described with reference to FIGS. 1 and 2. In an example, a context identifier component of the translation evaluation generates a context vector based on the context identifier as described with reference to FIG. 8, an encoder of the translation evaluation apparatus encodes a source text representation and a translation text representation based on the source text, the context vector, and the translation as described with reference to FIGS. 6 and 7, and a decoder of the translation evaluation apparatus decodes the source text representation and the translation text representation to obtain translation quality information as described with reference to FIG. 6.

At operation 515, the system provides a result of the evaluation to the user. In some cases, the operations of this step refer to, or may be performed by, a translation evaluation apparatus as described with reference to FIGS. 1 and 2. For example, the translation evaluation apparatus displays the translation quality information to the user via the graphical user interface.

Figure 6:
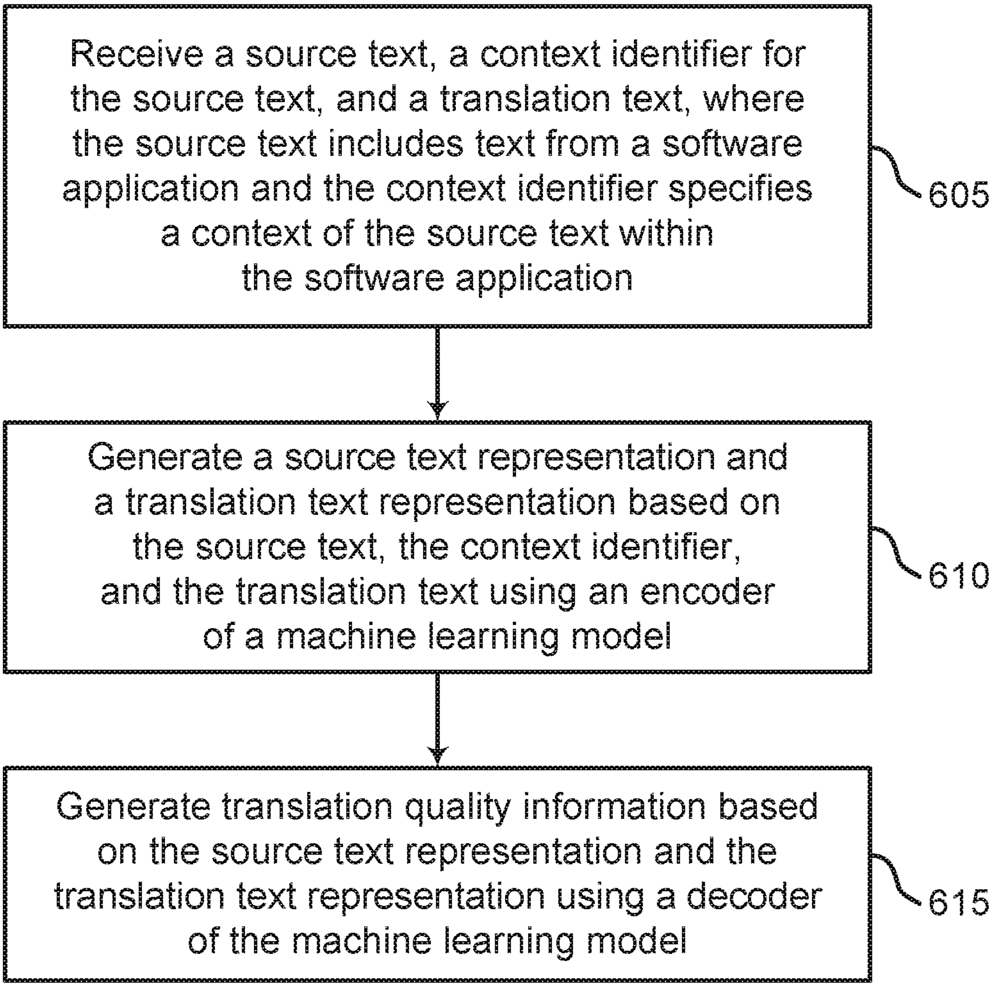
FIG. 6 shows an example of generating translation quality information according to aspects of the present disclosure.

FIG. 6 shows an example of generating translation quality information according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, the system receives a source text, a context identifier for the source text, and a translation text as input. In some embodiments, the source text includes text from a software application, the context identifier specifies a context of the source text within the software application, and the translation text is a translation of the source text in a translation language. The system then generates a source text representation of the source text and a translation text representation of the translation text based on the source text, the context identifier, and the translation text. Finally, the system generates translation quality information based on the source text representation and the translation text representation, thereby providing a user with a numerical evaluation of the translation text that accounts for the software application context of the source text and the translation text.

At operation 605, the system receives a source text, a context identifier for the source text, and a translation text, where the source text includes text from a software application and the context identifier specifies a context of the source text within the software application. In some cases, the operations of this step refer to, or may be performed by, a translation evaluation apparatus as described with reference to FIGS. 1 and 2.

According to some aspects, the context identifier indicates an association between the source text and a component of a user interface of the software application. For example, in some embodiments, the context identifier is metadata attached to the source text (e.g., by inclusion in a computer file that also includes the source text, or by association with the source text according to a data schema) that specifies types and locations of the source text in a software application, as well as the purposes of the source text. Examples of metadata included in the context identifier includes "OK button label", "prompt message", "main window title", etc. In some embodiments, the context identifier is a text string that includes one or more concatenated metadata. In some embodiments, the context identifier includes HTML code.

According to some aspects, the translation text is a translation of the source text in a translation language different than a source language of the source text. In some embodiments, the source text is text that is displayed in a user interface of a software application.

In some embodiments, a user provides one or more of the source text, the translation text, and the context identifier to the translation evaluation apparatus by an uploading process, a device-to-device file transfer process, etc. In some embodiments, the translation evaluation apparatus retrieves one or more of the source text, the translation text, and the context identifier from a database such as the database described with reference to FIG. 1, or from a data source such as a website, online archive, etc. In some embodiments, the translation evaluation apparatus retrieves one or more of the source text, the translation text, and the context identifier in response to a prompt received from a user via a graphical user interface.

At operation 610, the system generates a source text representation and a translation text representation based on the source text, the context identifier, and the translation text. In some cases, the operations of this step refer to, or may be performed by, an encoder as described with reference to FIGS. 2-4.

In some embodiments, the encoder receives the source text and the translation text and generates a source text embedding and a translation text embedding in response. In some embodiments, the source text embedding is an embedding matrix that includes an embedding vector of each word in the source text, and the translation text embedding is an embedding matrix that includes an embedding vector of each word in the translation text. According to some aspects, each of the source text embedding and the translation text embedding include semantic information of each token in the source text and in the translation text, respectively, where a token corresponds to words and sub-words in the source text and the translation text. According to some aspects, the encoder generates a source text attention mask and a translation text attention mask based on the source text and the translation text.

According to some aspects, the encoder removes markup tags from the source text and the translation text to obtain a pre-processed source text and a pre-processed translation text, where the source text embedding is based on the pre-processed source text and the translation text embedding is based on the pre-processed translation text. In an example, the encoder removes all HTML tags from the source text and the translation text. In an example, the encoder removes all escape characters from the source text and the translation text. In an example, the encoder replaces all URLs in the source text and the translation text with one placeholder word. In an example, the encoder replaces a newline character and an escaped newline character with a single space.

According to some aspects, the encoder replaces localization terms in the source text and the translation text with localization placeholders to obtain the pre-processed source text and the pre-processed translation text, where the source text embedding is based on the pre-processed source text and the translation text embedding is based on the pre-processed translation text. In an example, the encoder replaces all localization placeholders (such as a placeholder used in the source language of the source text or a placeholder used in the translation language of the translation text) with one placeholder word.

According to some aspects, the encoder identifies a source language of the source text and a translation language of the translation text. In some embodiments, the encoder identifies the source language and the target language based on information provided by a user to the translation evaluation apparatus. In some embodiments, the encoder detects the source language and the translation language by analyzing the source text and the translation text to determine the source language and the target language.

According to some aspects, the encoder selects a source language model based on the source language and a translation language model based on the translation language. In an example, after data preprocessing, the encoder selects a source language model and a translation language model from a registered language model list stored in a database such as the database described with reference to FIG. 1, or from another data source such as a website or an online archive. In some embodiments, depending on how the language models are registered, separate models for the source language and the translation language are selected. In some embodiments, one single language model is selected for both the source language and the target language.

According to some aspects, the source text embedding and the translation text embedding are based on the source language model and the translation language model, respectively. In an example, the encoder outputs the source text embedding and the translation embedding in response to receiving the source text, the source language model, the translation text, and the translation language model as inputs. In some embodiments, the encoder generates the source text attention mask and the translation text attention mask based on the source text, the translation text, the source language model, and the translation language model.

In some embodiments, the source text representation and the translation text representation are based on the source text embedding and the translation text embedding. For example, according to some aspects, the encoder provides the source text embedding and the translation text embedding to a recurrent neural network described with reference to FIG. 3, and the recurrent neural network generates a hidden source text representation and a hidden translation text representation based on the source text embedding, the translation text embedding, and the context identifier. In some embodiments, a context feature component described with reference to FIG. 3 obtains a context vector based on the context identifier as described with reference to FIG. 8, and the context feature component provides the context vector to the recurrent neural network.

In some embodiments, the recurrent neural network computes the hidden source text representation and the hidden translation text representation by first obtaining an appended source text embedding by appending the context vector along the first dimension of the source text embedding as an extra word vector and then processing the appended source text embedding and the translation text embedding to obtain the hidden source text representation and the hidden translation text representation, where each of the hidden source text representation and the hidden translation text representation are a combination of hidden states output by each layer and direction of the recurrent neural network for each token in the appended source text embedding and the translation text embedding. In some embodiments, the appended source text embedding and the translation text embedding are processed using separate RNN modules (implemented as hardware circuits, firmware, or software) of the recurrent neural network.

According to some aspects, a cross-attention component of the encoder described with reference to FIG. 3 generates the source text representation and the translation text representation based on the hidden source text representation and the hidden translation text representation as described with reference to FIG. 7.

At operation 615, the system generates translation quality information based on the source text representation and the translation text representation using a decoder of the machine learning model. In some cases, the operations of this step refer to, or may be performed by, a decoder as described with reference to FIGS. 2 and 3.

In some embodiments, the decoder receives the source text representation and the translation text representation from the encoder and generates a binary class label denoting a correct or incorrect translation (e.g., a value of "0" corresponds to an incorrect translation text, and a value of "1" corresponds to a correct translation text, or vice-versa) by combining the source text representation and the translation text representation to obtain a combined vector, applying batch normalization to the combined vector, and passing the normalized combined vector to a classifier network of the decoder described with reference to FIG. 3 for binary class label prediction. The decoder thereby outputs the predicted binary class label as the translation quality information.

In some embodiments, the decoder receives the source text representation and the translation text representation from the encoder and predicts a real-valued score including a real number by combining the source text representation and the translation text representation to obtain a combined vector, applying batch normalization to the combined vector, and passing the normalized combined vector to a regressor network of the decoder described with reference to FIG. 3 for a real-valued score prediction. The decoder thereby outputs the predicted real-valued score as the translation quality information.

According to some aspects, a CLTE component described with reference to FIGS. 2 and 3 generates a cross-lingual textual entailment (CLTE) feature vector representing a plurality of structural features of the source text and the translation text, and the decoder generates the translation quality information based on the CLTE feature vector.

In some embodiments, the CLTE component receives the source text and translation text as inputs and calculates the cross-lingual textual entailment (CLTE) feature vector for the source text and translation text as the output. In an example, the CLTE component uses the plurality of structural features of the source text and the translation text as an indicator to predict whether the source text and the translation text have mutual entailment relations (i.e., the source text entails the translation text and the translation text entails the source text), where a mutual entailment relation is positively correlated with a measurement of the quality of the translation text. In some embodiments, the CLTE feature vector is a real-valued vector including the result of the prediction and represents the degree of mutual entailment between the source text and the translation text. In some embodiments, the decoder computes the translation quality information using the CLTE feature vector as an additional input, where the CLTE feature vector is combined with the source text representation and translation text representation as the combined vector.

In some embodiments, the CLTE feature vector includes syntactic features representing the plurality of structural features. In an example, the CLTE feature vector includes values corresponding to one or more first syntactic features included in the source text, such as a number of words, a number of punctuation marks, a number of verbs, a number of nouns, a number of pronouns, a number of adjectives, a number of adverbs, a number of coordinating conjunctions, a number of numerals, a number of particles, a number of adpositions, a number of determiners, a number of auxiliary verbs, a number of interjections, a number of proper nouns, a number of subordinating conjunctions, a number of symbols, a number of other words, or any combination thereof.

In some embodiments, the CLTE feature vector includes values corresponding to one or more second syntactic features included in the translation text, where the second syntactic features are features included in the translation text that are similar to the first syntactic features included in the source text (e.g., number of words, number of punctuation marks, number of verbs, and so on). In some embodiments, the CLTE feature vector includes values corresponding to a ratio of a first syntactic feature to a similar second syntactic feature. In some embodiments, the CLTE feature vector includes one or more values corresponding to a ratio of a second syntactic feature to a similar first syntactic feature.

In some embodiments, the CLTE component identifies a phrase dictionary between a source language of the source text and a translation language of the translation text and computes dictionary features based on the phrase dictionary, where the CLTE feature vector includes the dictionary features representing the plurality of structural features. In an example, the CLTE component identifies the phrase dictionary in response to a user input. In an example, the CLTE component detects the source language and the translation language, and retrieves the phrase dictionary from a database such as the database described with reference to FIG. 1 or from a data source such as a website or online archive based on the detection.

In some embodiments, the CLTE component determines that a phrase included in the source text corresponds to a phrase included in the translation text by using the phrase dictionary. In some examples, the dictionary features include one or more of a number of phrases included in both the source text and the phrase dictionary (e.g., "in-dictionary source phrases"), a number of phrases included in both the phrase dictionary and the translation text (e.g., "in-dictionary translation phases"), a number of phrases included in the source text for which the CLTE component determines that the translation text omits a corresponding phrase (e.g., "missing phrases"), a ratio of missing phrases to in-dictionary source phrases, and a ratio of missing phrases to in-dictionary translation phrases. In some embodiments, the CLTE component adds a small number to a divisor when computing the CLTE vector to avoid dividing by zero.

In some embodiments, for certain source languages and translation languages, the CLTE feature vector includes language-specific features representing the plurality of structural features. In an example, the translation language is Japanese, and the CLTE component includes one or more of a number of pronominal adjectives, period marks, honorific suffixes, and honorific prefixes included in the translation text as the language-specific features. In other examples, the CLTE component includes one or more language-specific features corresponding to grammatical and syntactical features of the target language.

In some embodiments, the CLTE feature vector includes dependency role-based features representing the plurality of structural features. In an example, the CLTE component receives a source language word embedding dictionary and a translation language word embedding dictionary in response to a user input, or retrieves the source language and the translation language from a data source (such as the database or other data source) after detecting the source language and the translation language, and computes the CLTE feature vector based on the source language word embedding dictionary and the translation language word embedding dictionary.

In some embodiments, the dependency role-based features include one or more features related to noun chunks. A noun chunk refers to a group of words including a noun and words describing the noun. For example, named-entity-labeled noun chunks are noun chunks in which named entities are replaced by their entity category labels. In some embodiments, the CLTE component firstly converts noun-chunks into noun-chunk vectors by looking up word vectors in the source and translation word embedding dictionaries and then averaging all word vectors for a same chunk to generate the noun-chunk vectors. The CLTE component computes similarity scores between noun-chunk vectors using cosine similarity or other similarity determination techniques.

Examples of noun-chunk related features include similarity scores of first to fifth most similar noun chunks and similarity scores of first to fifth most similar named-entity-labeled noun chunks. In cases where a total number of noun chunks in the source text and the translation text is less than five, positions in the CLTE feature vector corresponding to the omitted noun chunks may be filled with a similarity score computed between the source text and the translation text.

In some embodiments, the dependency role-based features include one or more features related to dependency trees. A dependency tree refers to a directed graphs depicting dependency relations between words in a sentence, where a leaf node in the dependency tree represents a word of a sentence and a non-leaf node represents a dependency relation between child nodes connected by the non-lead node. Examples of features related to dependency trees include a ratio of a number of second-level nodes in a dependency tree of the source text to a dependency tree of the translation text, and a ratio of a number of second-level nodes in the translation text dependency tree to the source text dependency tree.

In some embodiments, similar ratios are computed for third- to fifth-level nodes, where the second- to fifth-level nodes are counted and compared to capture a semantic similarity of the source text and the translation text. In cases where a maximum depth of either of the source text dependency tree or the translation text dependency tree is less than five, corresponding node numbers of omitted depth levels can be filled with zeros.

Figure 7:
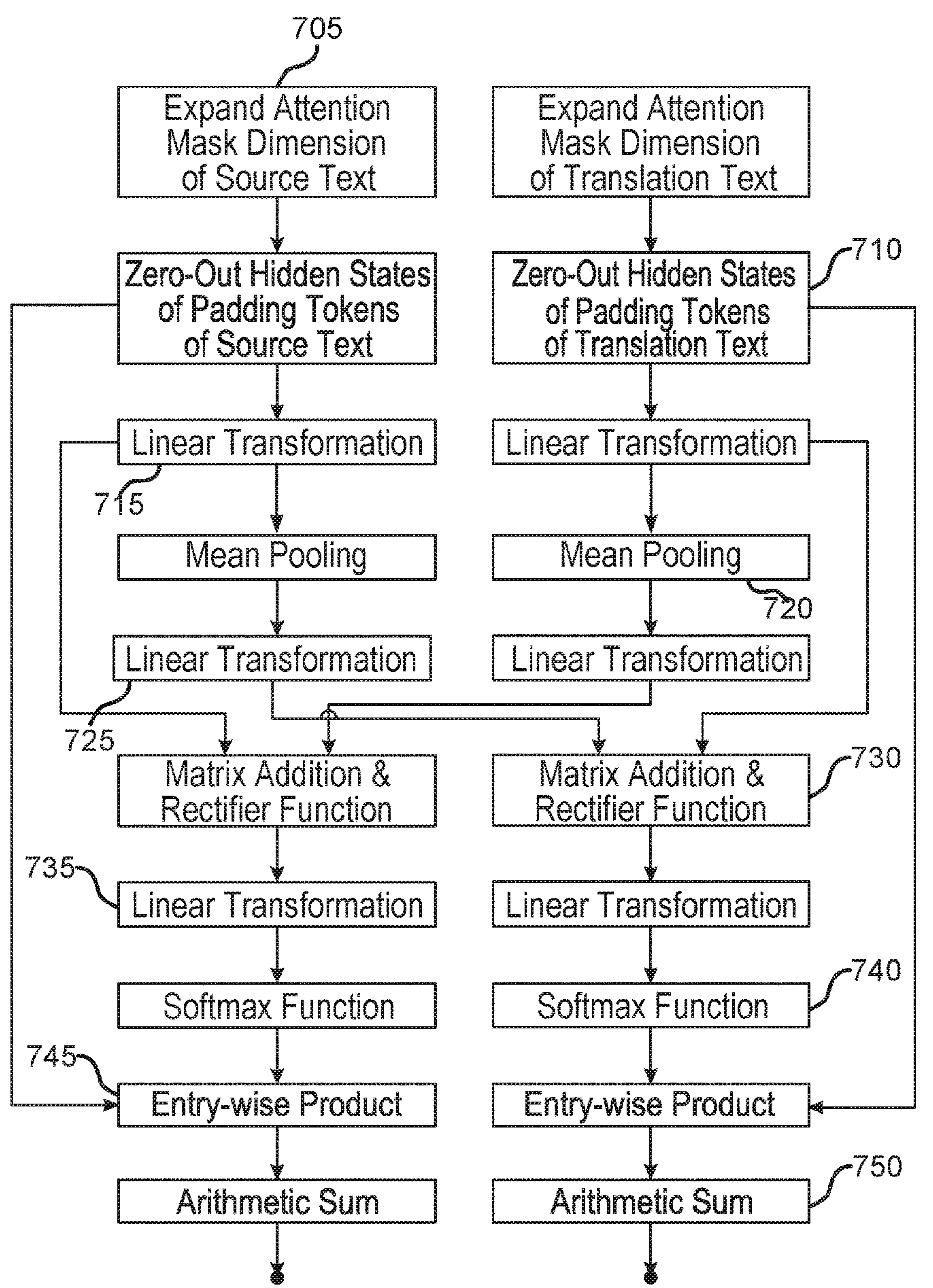
FIG. 7 shows an example of generating a source text representation and a translation text representation according to aspects of the present disclosure.

FIG. 7 shows an example of generating a source text representation and a translation text representation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 7, according to some aspects, a cross-attention component of the encoder described with reference to FIG. 3 generates the source text representation and the translation text representation based on the hidden source text representation and the hidden translation text representation obtained as described with reference to FIG. 6. In some embodiments, the source text representation and the translation text representation are based on the source text attention mask and the translation text attention mask. For example, according to some aspects, the cross-attention component receives the hidden source text representation, the source text attention mask, the hidden translation task representation, and the translation text attention mask as inputs and calculates attention scores for each token in the hidden source text representation and the hidden translation text representation.

In some embodiments, the cross-attention component calculates weights for each word and each sub-word in the source text and in the translation text based on semantic relation information between the source text and the translation text. The attention weights correspond to portions of the source text and the translation text that most contribute to the translation quality information. According to some aspects, the cross-attention component computes the attention weights using one or more weighting algorithms. In some embodiments, the cross-attention component then uses a pooling function to generate the source text representation and the translation text representation as sentence-wise representations based on the attention scores, the hidden source text representation, and the hidden translation text representation.

At operation 705, the cross-attention component obtains a binary source matrix by expanding the source text attention mask from a two-dimensional matrix that includes a batch size and a sequence length to a three-dimensional matrix that includes a batch size, a sequence length, and an RNN hidden state length. The cross-attention component populates the RNN hidden state length with existing batch size and sequence length values. The cross-attention component likewise obtains a binary translation matrix by expanding the translation text attention mask from a two-dimensional matrix to a three-dimensional matrix.

At operation 710, the cross-attention component uses the binary source matrix as a conditional matrix to zero-out entries in the hidden source text representation that correspond to entries in the binary source matrix that include a value of "0" to obtain a source matrix, and uses the binary translation matrix as a conditional matrix to zero-out entries in the hidden translation text representation that correspond to entries in the binary translation matrix that include a value of "0" to obtain a translation matrix.

At operation 715, the cross-attention component applies linear transformations to each of the source matrix and the translation matrix to obtain a first transformed source matrix and a first transformed translation matrix, respectively.

At operation 720, the cross-attention component calculates arithmetic mean values along the sequence length dimension of each of the first transformed source matrix and the first transformed translation matrix to obtain an averaged source matrix and an averaged translation matrix, respectively.

At operation 725, the cross-attention component applies linear transformations to each of the averaged source matrix and the averaged translation matrix to obtain a second transformed source matrix and a second transformed translation matrix, respectively.

At operation 730, the cross-attention component applies a rectifier function to a matrix addition of the first transformed source matrix and the second transformed translation matrix to obtain a first rectified matrix, and applies the rectifier function to a matrix addition of the first transformed translation matrix and the second transformed source matrix to obtain a second rectified matrix.

At operation 735, the cross-attention component applies a linear transformation to the first rectified matrix to obtain a first transformed matrix, and applies the linear function to the second rectified matrix to obtain a second transformed matrix.

At operation 740, the cross-attention component applies a softmax function to the first transformed matrix to obtain a first softmax matrix, and applies the softmax function to the second transformed matrix to obtain a second softmax matrix.

At operation 745, the cross-attention component calculates an entry-wise product of the first softmax matrix and the source matrix to obtain a first product matrix, and calculates an entry-wise product of the second softmax matrix and the translation matrix to obtain a second product matrix.

At operation 750, the cross-attention component calculates arithmetic sum values along the sequence length dimension of the first product matrix to obtain the source text representation, and calculates arithmetic sum values along the sequence length dimension of the second product matrix to obtain the translation text representation.

Figure 8:
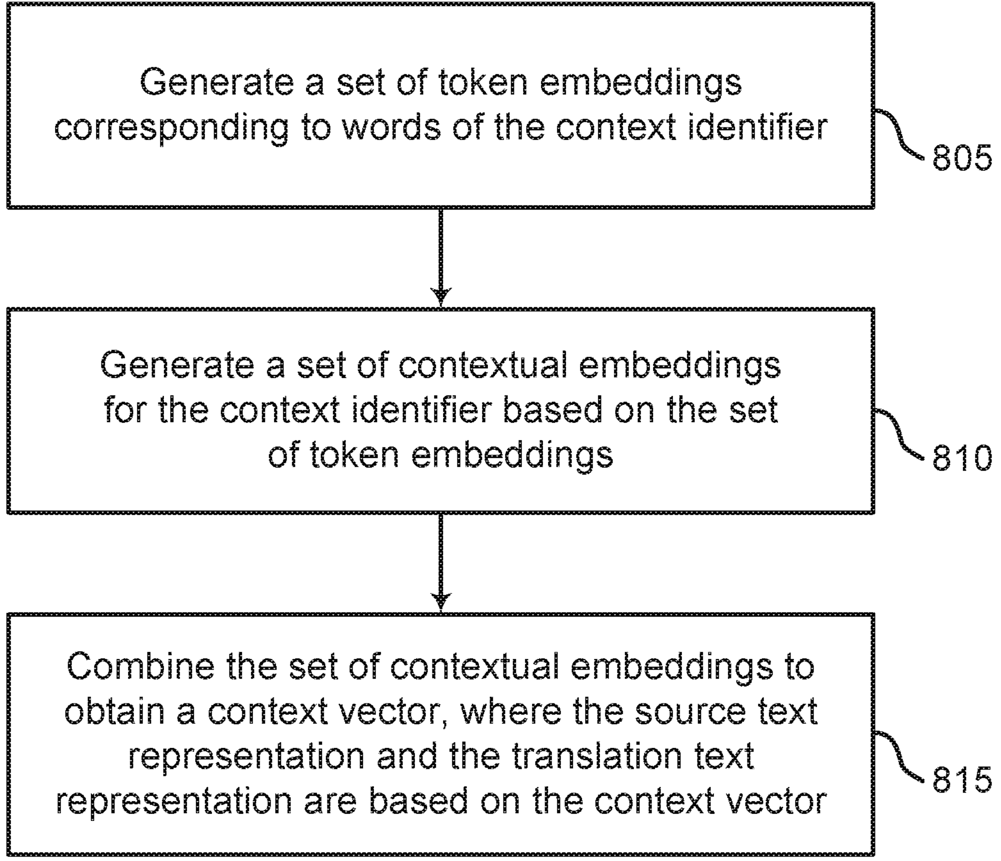
FIG. 8 shows an example of obtaining a context vector according to aspects of the present disclosure.

FIG. 8 shows an example of obtaining a context vector according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 8, the system tokenizes a context identifier and generates a context vector using a convolutional neural network (CNN) contextual embedding approach.

At operation 805, the system generates a set of token embeddings corresponding to words of the context identifier. In some cases, the operations of this step refer to, or may be performed by, a context feature component as described with reference to FIGS. 2 and 4. For example, a tokenizer of the context feature component described with reference to FIG. 4 outputs a token sequence corresponding to the context identifier by separating the context identifier into words using a predefined set of delimiters and separating camel-cased strings into separate words. In some embodiments, a word embedding module of the context feature component described with reference to FIG. 4 converts the token sequence into the set of token embeddings.

At operation 810, the system generates a set of contextual embeddings for the context identifier based on the set of token embeddings. In some cases, the operations of this step refer to, or may be performed by, a context feature component as described with reference to FIGS. 2-4. For example, in response to receiving an input token sequence of n tokens, an m-layered CNN of the context feature component described with reference to FIG. 4 generates vectors $V_{i,j}$, where $i \in [1, n]$ and $j \in [1, m]$, and stacks all vectors with a same i value to form a contextual embedding $V_i$. The multi-layer CNN outputs the sequence of all contextual embeddings $V_i$, where $i \in [1, n]$, as the set of contextual embeddings.

At operation 815, the system combines the set of contextual embeddings to obtain a context vector, where the source text representation and the translation text representation are based on the context vector. In some cases, the operations of this step refer to, or may be performed by, a context feature component as described with reference to FIGS. 2-4. For example, a sum function of the context feature component described with reference to FIG. 4 sums the set of contextual embeddings along the first dimension (e.g., the dimension with indices of 1, 2, . . . n) to generate the context vector as a one-dimensional embedding vector corresponding to the context identifier.

Training

A method for translation evaluation is described with reference to FIG. 9. One or more aspects of the method include receiving training data including a source text, a context identifier for the source text, a translation text, and ground-truth translation quality information, wherein the source text comprises text from a software application and the context identifier specifies a context of the source text within the software application; generating a source text representation and a translation text representation based on the source text, the context identifier, and the translation text using an encoder of a machine learning model; generating predicted translation quality information based on the source text representation and the translation text representation using a decoder of the machine learning model; computing a loss function based on the predicted translation quality information and the ground truth translation quality information; and updating parameters of the machine learning model based on the loss function. In some aspects, the context identifier indicates an association between the source text and a component of a user interface of the software application.

Figure 9:
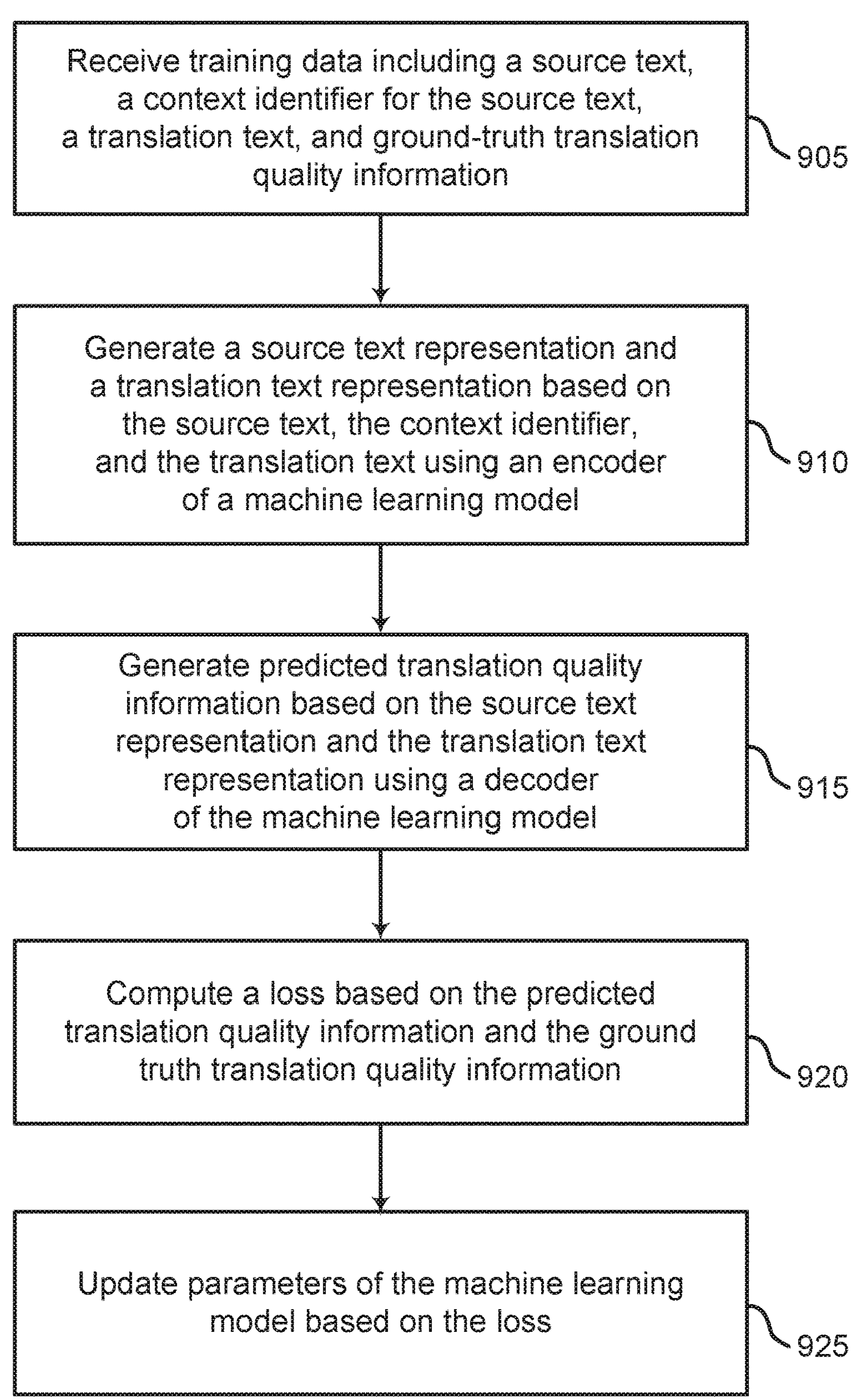
FIG. 9 shows an example of training a machine learning model according to aspects of the present disclosure.

FIG. 9 shows an example of training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system receives training data including a source text, a context identifier for the source text, a translation text, and ground-truth translation quality information. In some cases, the operations of this step refer to, or may be performed by, a training component as described with reference to FIG. 2. In some embodiments, a user provides the training data to the training component as an input to the translation evaluation apparatus. In some embodiments, the training component retrieves the training data from a database such as the database described with reference to FIG. 1, or from another data source such as a website or an online archive.

At operation 910, the system generates a source text representation and a translation text representation based on the source text, the context identifier, and the translation text using an encoder of a machine learning model. In some cases, the operations of this step refer to, or may be performed by, an encoder as described with reference to FIGS. 2-4. In an example, the encoder generates the source text representation and the translation text representation as described with reference to FIG. 6.

At operation 915, the system generates predicted translation quality information based on the source text representation and the translation text representation using a decoder of the machine learning model. In some cases, the operations of this step refer to, or may be performed by, a decoder as described with reference to FIGS. 2 and 3. In an example, the decoder generates predicted translation quality information by obtaining the translation quality information for the source text and the translation text as described with reference to FIG. 6.

At operation 920, the system computes a loss based on the predicted translation quality information and the ground truth translation quality information. In some cases, the operations of this step refer to, or may be performed by, a training component as described with reference to FIG. 2. In an example, the training component computes the loss by comparing the predicted translation quality information and the ground truth translation quality information using a loss function, such as a quadratic loss function, a 0-1 loss function, etc. The term "loss function" refers to a function that impacts how a machine learning model is trained in a supervised learning model. Specifically, during each training iteration, the output of the model is compared to the known annotation information in the training data. The loss function provides a value (the loss) for how close the predicted annotation data is to the actual annotation data.

At operation 925, the system updates parameters of the machine learning model based on the loss. In some cases, the operations of this step refer to, or may be performed by, a training component as described with reference to FIG. 2. For example, after computing the loss, the training component updates the parameters of the machine learning model based on the loss, and a new set of predictions are made by the machine learning model during the next iteration.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

receiving a source text, a context identifier for the source text, and a translation text, wherein the source text comprises text displayed in a user interface of a software application and the context identifier comprises text that describes the user interface;

generating a sequence of contextual embeddings by tokenizing the context identifier to obtain a token sequence and performing contextual embedding on the token sequence to obtain the sequence of contextual embeddings;

generating a context vector based on the sequence of contextual embeddings, wherein the context vector represents the context identifier in a vector space;

generating a source text representation based on the source text and the context vector using an encoder of a machine learning model, wherein the source text representation comprises a representation of the source text and a visual context of the source text based on the context identifier;

generating a translation text representation based on the translation text using the encoder; and generating a translation quality prediction score for the translation text based on the source text representation and the translation text representation using a decoder of the machine learning model, wherein the translation quality prediction score accounts for the visual context of the source text within the user interface.

2. The method of claim 1, further comprising:

generating a source text embedding and a translation text embedding based on the source text and the translation text, respectively, wherein the source text representation and the translation text representation are based on the source text embedding and the translation text embedding, respectively.

3. The method of claim 2, further comprising:

identifying a source language of the source text and a translation language of the translation text; and selecting a source language model based on the source language and a translation language model based on the translation language, wherein the source text embedding and the translation text embedding are based on the source language model and the translation language model, respectively.

4. The method of claim 2, further comprising:

removing markup tags from the source text and the translation text to obtain a pre-processed source text and a pre-processed translation text, respectively, wherein the source text embedding is based on the pre-processed source text and the translation text embedding is based on the pre-processed translation text.

5. The method of claim 2, further comprising:

replacing localization terms in the source text and the translation text with localization placeholders to obtain a pre-processed source text and a pre-processed translation text, respectively, wherein the source text embedding is based on the pre-processed source text and the translation text embedding is based on the pre-processed translation text.

6. The method of claim 2, further comprising:

generating a source text attention mask and a translation text attention mask based on the source text and the translation text, respectively, wherein the source text representation and the translation text representation are based on the source text attention mask and the translation text attention mask, respectively.

7. The method of claim 2, further comprising:

generating a hidden source text representation based on the source text embedding and the context vector using a recurrent neural network of the encoder; and generating a hidden translation text representation based on the translation text embedding using the recurrent neural network.

8. The method of claim 7, further comprising:

generating the source text representation and the translation text representation based on the hidden source text representation and the hidden translation text representation, respectively, using a cross-attention component of the encoder.

9. The method of claim 1, further comprising:

combining the sequence of contextual embeddings to obtain the context vector.

10. The method of claim 1, further comprising:

generating a cross-lingual textual entailment (CLTE) feature vector representing a plurality of structural features of the source text and the translation text, wherein the translation quality prediction information is based on the CLTE feature vector.

11. The method of claim 10, further comprising:

identifying a phrase dictionary between a source language of the source text and a target language of the translation text; and computing dictionary features based on the phrase dictionary, wherein the CLTE feature vector includes the dictionary features.

12. The method of claim 1, further comprising:

generating a binary class label for the translation text based on the source text representation and the translation text representation, wherein the translation quality prediction score includes the binary class label.

13. The method of claim 1, further comprising:
generating a real-valued score for the translation text based on the source text representation and the translation text representation, wherein the translation quality prediction score includes the real-valued score.

14. The method of claim 1, further comprising:
generating a revised translation text for the source text based on the translation quality prediction score.

15. A method comprising:
receiving training data including a source text, a context identifier for the source text, a translation text, and ground-truth translation quality information, wherein the source text comprises text displayed in a user interface of a software application and the context identifier comprises text that describes the user interface;
generating a sequence of contextual embeddings by tokenizing the context identifier to obtain a token sequence and performing contextual embedding on the token sequence to obtain the sequence of contextual embeddings;
generating a context vector based on the sequence of contextual embeddings, wherein the context vector represents the context identifier in a vector space;
generating a source text representation based on the source text and the context vector using an encoder of a machine learning model, wherein the source text representation comprises a representation of the source text and a visual context of the source text based on the context identifier;
generating a translation text representation based on the translation text using the encoder;
generating a translation quality prediction score for the translation text based on the source text representation and the translation text representation using a decoder of the machine learning model, wherein the translation quality prediction score accounts for the visual context of the source text within the user interface;
computing a loss function based on the predicted translation quality information and the ground-truth translation quality information; and
updating parameters of the machine learning model based on the loss function.

16. A system comprising:
a memory component; and
a processing device coupled to the memory component, the processing device configured to perform operations comprising:
receiving a source text, a context identifier for the source text, and a translation text, wherein the source text comprises text displayed in a user interface of a software application and the context identifier comprises text that describes the user interface;
generating a sequence of contextual embeddings by tokenizing the context identifier to obtain a token sequence and performing contextual embedding on the token sequence to obtain the sequence of contextual embeddings;
generating a context vector based on the sequence of contextual embeddings, wherein the context vector represents the context identifier in a vector space;
generating a source text representation based on the source text and the context vector using an encoder of a machine learning model, wherein the source text representation comprises a representation of the source text and a visual context of the source text based on the context identifier;
generating a translation text representation based on the translation text using the encoder; and
generating a translation quality prediction score for the translation text based on the source text representation and the translation text representation using a decoder of the machine learning model, wherein the translation quality prediction score accounts for the visual context of the source text within the user interface.

17. The system of claim 16, further comprising:
a cross-lingual textual entailment (CLTE) component configured to generate a CLTE feature vector representing a plurality of structural features of the source text and the translation text, wherein the translation quality prediction score is based on the CLTE feature vector.

18. The system of claim 16, wherein:
the encoder includes a recurrent neural network and a cross-attention module.

19. The system of claim 16, wherein:
the decoder includes a regressor network and a classifier network.

* * * * *